US012774102B2

(12) United States Patent
Spagnolo et al.

(10) Patent No.: US 12,774,102 B2
(45) Date of Patent: Oct. 27, 2026

(54) POWER SOURCE ASSEMBLY FOR AN AERONAUTICAL VEHICLE

(71) Applicants: General Electric Deutschland Holding GmbH, Frankfurt (DE); GE Marmara Technology Center Muhendislik Hizmetleri Ltd, Gebze (TR)

(72) Inventors: Cosimo Spagnolo, Garching (DE); Ekrem Cengelci, Gebze (TR); Mohamed Osama, Garching (DE)

(73) Assignees: General Electric Deutschland Holding GmbH, Frankfurt (DE); GE Marmara Technology Center Muhendislik Hizmetleri Ltd, Gebze (TR)

( * ) Notice: Subject to any disclaimer, the term of this patent is extended or adjusted under 35 U.S.C. 154(b) by 96 days.

(21) Appl. No.: 18/672,804

(22) Filed: May 23, 2024

(65) Prior Publication Data

US 2025/0361018 A1 Nov. 27, 2025

(51) Int. Cl.
*B64D 27/355* (2024.01)
*H01M 8/04007* (2016.01)
(Continued)

(52) U.S. Cl.
CPC ...... *B64D 27/355* (2024.01); *H01M 8/04007* (2013.01); *H02J 4/00* (2013.01); *H02M 3/33576* (2013.01); *H01M 2250/20* (2013.01)

(58) Field of Classification Search
CPC ...... B64D 27/355; H02J 4/00; H02J 2101/30; H02J 2105/32; H02J 2207/20; H02J 7/34;
(Continued)

(56) References Cited

U.S. PATENT DOCUMENTS 6,847,127 B1 * 1/2005 Lee .......................... B60L 58/34
290/40 C
8,026,638 B2 9/2011 King et al.
(Continued)

FOREIGN PATENT DOCUMENTS

| | | | |
|---|---|---|---|
| CN | 210469103 | U | 5/2020 |
| CN | 116683773 | A | 9/2023 |
| EP | 3805107 | A1 | 4/2021 |

OTHER PUBLICATIONS

CN-121011683A, Zhang, Jing-ye et al., Cooling System of Hydrogen Fuel Cell _Oringial FOR Document and English Translation Included (Year: 2025).*

(Continued)

*Primary Examiner* — Rexford N Barnie
*Assistant Examiner* — Terrence R Willoughby
(74) *Attorney, Agent, or Firm* — Dority & Manning, P.A.

(57) ABSTRACT

A power source assembly is provided having a fuel cell module configured to provide a first direct current power output; a battery configured to provide a second direct current power output; and an isolated DC/DC converter in electrical connection between the fuel cell module and a load. The isolated DC/DC converter includes a DC/AC portion, an AC/DC portion, and a transformer that connects the DC/AC portion and AC/DC portion. The battery can be electrically connected to the DC/AC portion or the AC/DC portion. The isolated DC/DC converter ensures that the fuel cell module is electrically isolated from the load via the transformer.

9 Claims, 14 Drawing Sheets

(51) Int. Cl.
*H02J 4/00* (2026.01)
*H02M 3/335* (2006.01)

(58) Field of Classification Search
CPC .......... H02M 3/33576; H01M 2250/20; B60L 50/75; Y02T 90/40
USPC .................................................. 307/9.1–10.2
See application file for complete search history.

(56) References Cited

U.S. PATENT DOCUMENTS

| | | | | |
|---|---|---|---|---|
| 8,916,993 | B2 | 12/2014 | Berry et al. | |
| 10,272,788 | B2 | 4/2019 | Huh et al. | |
| 11,349,402 | B2 | 5/2022 | Breu et al. | |
| 11,420,757 | B2 | 8/2022 | Clarke et al. | |
| 11,644,886 | B1 | 5/2023 | Ben-Yaacov et al. | |
| 2003/0228503 | A1* | 12/2003 | Georgii | H01M 8/04559 429/432 |
| 2005/0140353 | A1 | 6/2005 | Sonntag et al. | |
| 2005/0275386 | A1* | 12/2005 | Jepsen | H02M 7/4807 322/9 |
| 2009/0325032 | A1* | 12/2009 | Hu | H01M 8/04067 429/515 |
| 2015/0188350 | A1 | 7/2015 | Deboy | |
| 2018/0145350 | A1* | 5/2018 | Matsumoto | H01M 8/04634 |
| 2022/0255316 | A1* | 8/2022 | Perkinson | B60L 3/003 |
| 2023/0009016 | A1 | 1/2023 | Stepchenkov et al. | |
| 2023/0163332 | A1* | 5/2023 | Sung | B60L 58/40 429/9 |
| 2024/0051433 | A1* | 2/2024 | Lee | B60L 58/40 |
| 2024/0313654 | A1* | 9/2024 | Giri | H02J 7/345 |

OTHER PUBLICATIONS

Co-Pending U.S. Appl. No. 18/466,430, filed Sep. 13, 2023.

Elmenshawy et al., Medium-Voltage DC-DC Converter Topologies for Electric Bus Fast Charging Stations: State-of-the-Art Review, Energies, vol. 15, Issue 15, 2022, 5487. https://doi.org/10 3390/en15155487.

Florida Power Electronics Center (FPEC), Isolated Switch-Mode dc-to-dc Converters, University of Central Florida, Chapter 5, 2020, 209-261. http://fpec.ucf.edu/wp-content/uploads/2020/11/Chapter-5.pdf.

Gemmen, Analysis for the Effect of Inverter Ripple Current on Fuel Cell Operating Condition, Journal of Fluids Engineering, vol. 125, Issue 3, May 2003, 576-585. (Abstract Only) https://doi.org/10.1115/1.1567307.

Hoenicke et al., Power Management Control and Delivery Module for a Hybrid Electric Aircraft Using Fuel Cell and Battery, Energy Conversion and Management, vol. 244, 2021, 114445. https://doi.org/10.1016/j.enconman.2021.114445.

Pahon et al., Effect of Load Cycling on the Performance of Fuel Cell Stacks, HAL Open Science, Vehicle Power and Propulsion Conference, Vietnam, 2019, 5 Pages. https://hal.archives-ouvertes.fr/hal-02991594/document.

Wikipedia, Proton-Exchange Membrane Fuel Cell, 17 pages. Retrieved Dec. 29, 2023 from Weblink: https://en wikipedia.org/wiki/Proton-exchange_membrane_fuel_cell.

* cited by examiner

POWER SOURCE ASSEMBLY FOR AN AERONAUTICAL VEHICLE

FIELD

The present disclosure relates to a power source assembly for an aeronautical vehicle.

BACKGROUND

Aeronautical vehicles use a variety of power sources to drive one or more propulsors that may generate thrust for the vehicles. Many vehicles use gas turbine engines, having a turbomachine and a rotor assembly. While gas turbine engines have advanced significantly over the years, it may be beneficial to examine inclusion of other power sources as a primary or secondary source of power for the vehicle. However, in the process of developing new power sources, it may be important to make sure the new technologies do not create other inefficiencies in the form of excess weight, or the like.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
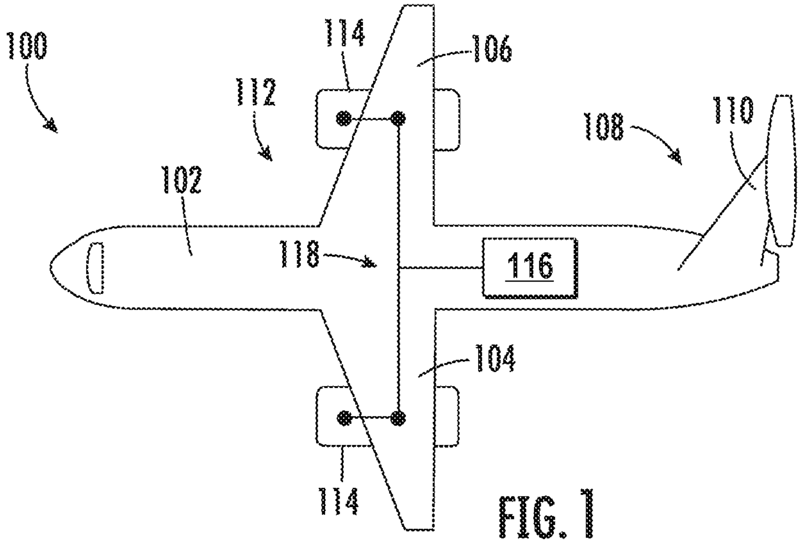
FIG. 1 is schematic, perspective view of an aeronautical vehicle in accordance with an aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The phrases "from X to Y" and "between X and Y" each refers to a range of values inclusive of the endpoints (i.e., refers to a range of values that includes both X and Y).

As used herein, the term "maximum power draw" refers to the maximum amount of electric power required for a particular component during all anticipated non-failure mode and non-emergency mode operations for the particular component.

Referring now to the drawings, wherein identical numerals indicate the same elements throughout the figures, FIG. 1 is a schematic view of an aeronautical vehicle 100 in accordance with an exemplary embodiment of the present disclosure. The exemplary aeronautical vehicle 100 of FIG. 1 is configured as an aircraft. The aircraft generally includes a fuselage 102 forming a main body portion of the vehicle 100, a first wing 104 extending from a port side of the aircraft and a second wing 106 extending from a starboard side of the aircraft. The first and second wings 104, 106 each extend laterally from the fuselage 102. The aircraft further includes an empennage 108 having one or more stabilizer 110, and, in particular, including a vertical stabilizer and a horizontal stabilizer.

The vehicle 100 further includes a propulsion system 112 that includes one or more propulsors 114 and one or more power sources 116. The propulsion system 112 further includes an electric power distribution bus 118 electrical coupling various components of the propulsion system 112.

Figure 2:
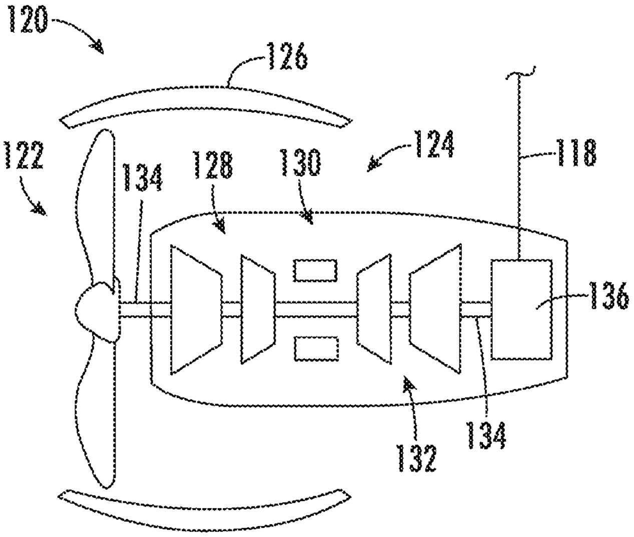
FIG. 2 is a schematic, perspective view of a gas turbine engine in accordance with an aspect of the present disclosure.

Referring now to FIG. 2, a schematic view of a propulsor as may be incorporated into the exemplary propulsion system 112 of the vehicle 100 of FIG. 1 is provided. More specifically, for the embodiment depicted, the propulsor is configured as a gas turbine engine 120, and more specifically, still, the gas turbine engine 120 of FIG. 2 is configured as a turbofan engine. The turbofan engine includes a fan section 122 and a turbomachine 124 drivingly coupled to the fan section 122. The turbofan engine further includes an outer nacelle 126 enclosing at least in part the fan section 122 and the turbomachine 124. The turbomachine 124 generally includes a compressor section 128, a combustion section 130, and a turbine section 132 arranged in serial flow order, and one or more shafts 134 connecting, e.g., a fan of the fan section 122, one or more compressors of the compressor section 128, and one or more turbines of the turbine section 132. Moreover, for the embodiment of FIG. 2, the turbofan engine further includes an electric machine 136 rotatable with the one or more shafts 134 of the turbomachine 124, with the fan section 122, or both. The electric machine 136 may be configured to extract electrical power from the turbofan engine and provide such electrical power to an electric power distribution bus 118, such as the electric power distribution bus 118 of FIG. 1. Additionally, or alternatively, the electric machine 136 may be configured to receive electric power from the electric power distribution bus 118 to, e.g., drive the fan of the fan section 122.

Figure 3:
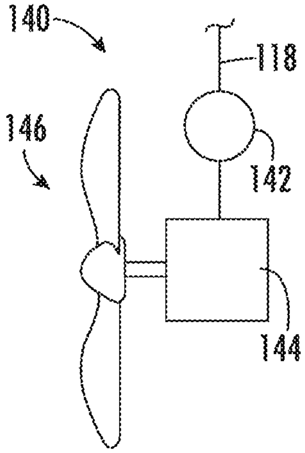
FIG. 3 is a schematic, perspective view of an electric propulsor in accordance with an aspect of the present disclosure.

Referring now to FIG. 3, a schematic view of a propulsor as may be incorporated into the exemplary propulsion system 112 of the vehicle 100 of FIG. 1 in accordance with another exemplary aspect of the present disclosure is provided. For the embodiment of FIG. 3, the propulsor is configured as an electric fan 140. The electric fan 140 generally includes an inverter 142, an electric machine 144 (e.g., in the form of an electric motor), and a fan 146.

The inverter 142 is configured to receive electrical power from, e.g., an electric power distribution bus 118 (such as the electric power distribution bus 118 of FIG. 1) and convert the received electrical power from, e.g., a direct-current ("DC") electrical power to an alternating current ("AC") electrical power. The electric machine 144 is configured as an electric motor configured to receive the electric power from the inverter 142 and convert the electric power into a mechanical, rotational force to drive the fan 146 and generate thrust.

Figure 4:
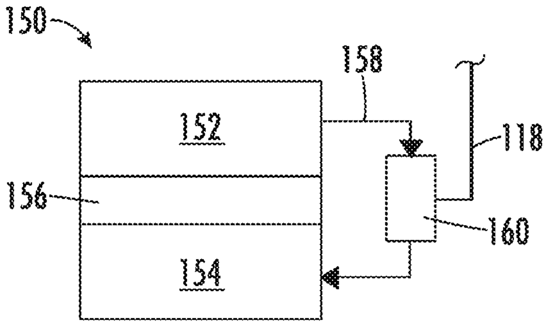
FIG. 4 is a schematic view of a fuel cell module in accordance with an exemplary aspect of the present disclosure.

Referring now to FIG. 4, a power source is provided, which may be incorporated into the exemplary propulsion system 112 of the vehicle 100 of FIG. 1 in accordance with an exemplary aspect of the present disclosure. The power source is more specifically a fuel cell 150. Fuel cells are electro-chemical devices which can convert chemical energy from a fuel into electrical energy through an electro-chemical reaction of the fuel, such as hydrogen, with an oxidizer, such as oxygen contained in the atmospheric air.

The fuel cell 150 of FIG. 4 includes an anode 152, a cathode 154, and an electrolyte layer 156 positioned between the anode 152 and the cathode 154. During operation, fuel, such as a hydrogen fuel, is provided to the anode 152 and an oxygen containing gas, such as air, is provided to the cathode 154. Within the anode 152, hydrogen molecules from the fuel may be separated into protons and electrons, with the electrolyte layer 156 allowing only protons to pass through to the cathode 154. The electrons travel through an external electrical circuit 158 which may be electrically coupled to an electric power distribution bus 118, such as the electric power distribution bus 118 of FIG. 1, through a juncture box 160 (including e.g., various power electronics). At the cathode 154, protons, electrons, and oxygen are combined to form water as a byproduct.

As will be appreciated, the vehicle 100 depicted in FIG. 1 is provided by way of example only, and, in other exemplary embodiments, aspects of the present disclosure may be incorporated into any other suitable aeronautical vehicle 100. Similarly, the propulsors depicted in FIGS. 1 through 3 are also provided by way of example only. In other exemplary embodiments, aspects of the present disclosure may be incorporated into, or otherwise utilized with, any other suitable propulsors, such as any other suitable gas turbine engines having an electric machine (e.g., other turbofan engines, open rotor turbofan engines, turboprop engines, turboshaft engines, turbojet engines), any other suitable electric fans (e.g., ducted fans, distributed fan, vertical thrust fans, horizontal thrust fans, combination fans), or the like.

Further, it will be appreciated that the fuel cell 150 depicted as the power source in FIG. 4 may be any suitable type of fuel cell. Further, although a single fuel cell is depicted in FIG. 4, it will be appreciated that, as used herein, the term "fuel cell" may refer to a single fuel cell or an array of fuel cells connected to one another for providing an electrical power output. In particular, as a single fuel cell may only be able to generate a voltage of approximately 1 volt, a plurality of fuel cells may be stacked together (which may be referred to as a fuel cell stack). One or more fuel cell stacks may form a fuel cell module, and one or more fuel cell modules may form a fuel cell system to generate a desired voltage. Further, the fuel cell may be of any suitable chemistry. For example, the fuel cell 150 may include Solid Oxide Fuel Cells (SOFC), Molten Carbonate Fuel Cells (MCFC), Phosphoric Acid Fuel Cells (PAFC), and Proton Exchange Membrane Fuel Cells (PEMFC), all generally named after their respective electrolyte layers. Each of these fuel cells may have specific benefits in the form of a preferred operating temperature range, power generation capability, efficiency, etc.

Figure 5:
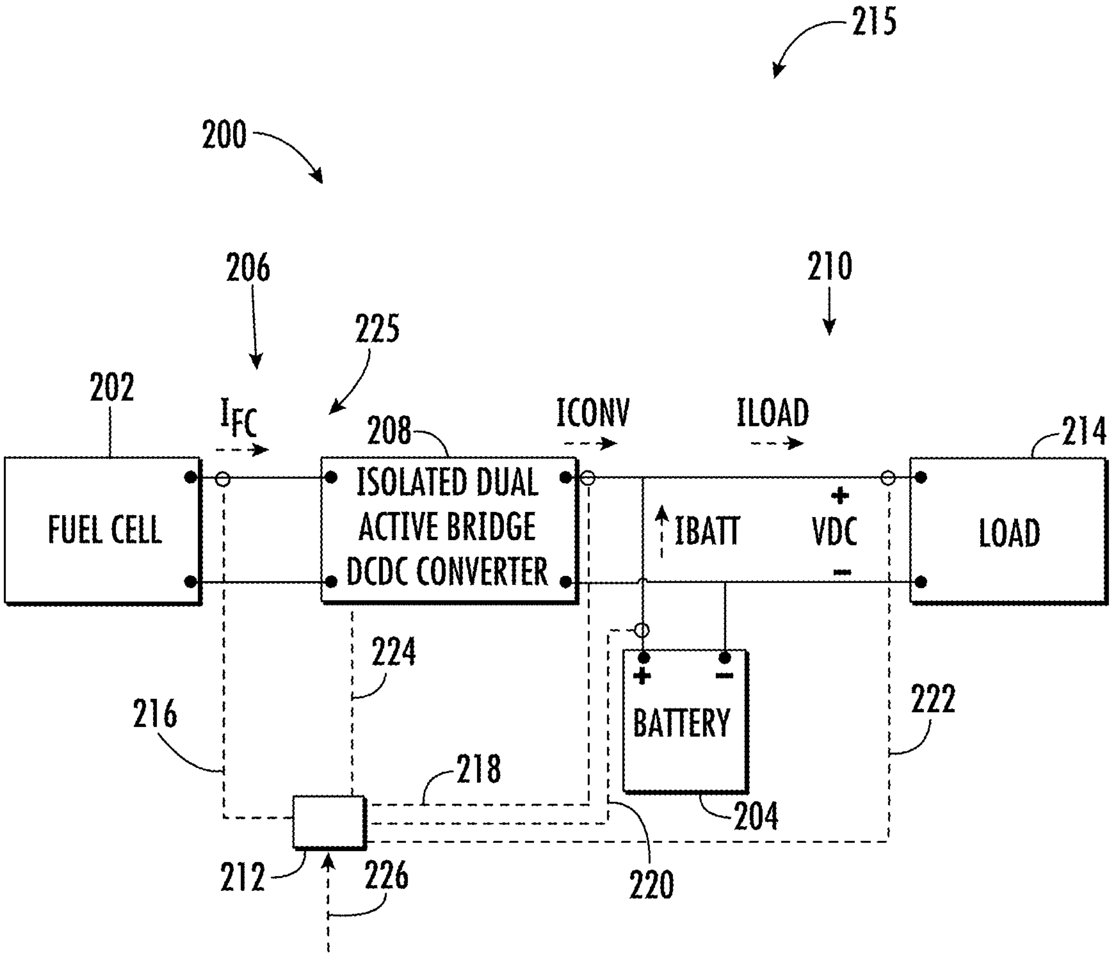
FIG. 5 is a schematic diagram of a power source assembly for an aeronautical vehicle in accordance with an exemplary aspect of the present disclosure.

Referring now to FIG. 5, a schematic diagram of a power source assembly 200 for an aeronautical vehicle in accordance with an exemplary aspect of the present disclosure is provided. The exemplary power source assembly 200 of FIG. 5 may be integrated into one or more of the exemplary aeronautical vehicles described herein (see, e.g., vehicle 100 of FIG. 1), may be used with one or more of the propulsors described herein (see, e.g., FIGS. 2 and 3), and may utilize one or more of the exemplary power sources described herein (see, e.g., FIG. 4).

More specifically, FIG. 5 schematically depicts an electric circuit for the power source assembly 200. As will be appreciated, the power source assembly 200 includes a fuel cell module 202, a battery 204, a first direct-current (DC) electric bus 206, an isolated DC/DC converter 208, and a second DC electric bus 210, and a controller 212. The isolated DC/DC converter 208 is described further below and is used in the power source assembly 200 to provide electric isolation between electrical components on either side of the isolated DC/DC converter 208, such as, for example, to electrically isolate the fuel cell module 202 from the load 214.

The power source assembly 200 can be used as part of a power assembly 215 useful to provide and deliver power to the fan 146. The power assembly 215 can include one or more devices useful to convert electric power to mechanical power which, in the illustrated embodiment of FIG. 3, includes the inverter 142 and electric machine 144. It will be appreciated that in the depiction of FIG. 3, the electric power distribution bus 118 can be the second DC electric bus 210 of FIG. 5.

Briefly, it will further be appreciated that for the embodiment depicted, the power source assembly 200 includes a controller 212 operably coupled to the isolated DC/DC converter 208 and configured to receive data indicative of operation of one or more components of the power source assembly 200. In the illustrated form, the isolated DC/DC converter 208 is configured to receive fuel cell module current output IFc indicated by line 216, a converter current output Iconv indicated by line 218, a battery current output Ibatt indicated by line 220, and a load input current Iload indicated by line 222. Any of the current outputs depicted in FIG. 5 can be measured using a suitable sensor or estimated. As will be appreciated, the load input current Iload should be the sum of the converter current output Iconv and the battery current output Iload. In other embodiments, the data received by the controller 212 may alternatively and/or additionally include voltage output of any of the fuel cell module 202, battery 204, and isolated DC/DC converter 208. Further, the controller 212 may be configured to receive data indicative of load voltage associated with the load 214. In some embodiments, the isolated DC/DC converter 208 can be configured to determine power of any given component based on sensed current and voltage from any variety of the components depicted. For example, the isolated DC/DC converter 208 can calculate power output from the fuel cell module 202 based on sensed current IFC via data line 216 and voltage (e.g., using a voltage measurement across the terminals of the fuel cell module 202).

The load 214 can represent one or more of any suitable electrical and/or electromechanical components that consume electrical power. In one form, the load 214 can include the inverter 142 and/or electric machine 144 depicted in FIG. 3.

The fuel cell module 202 may include one or more fuel cell stacks (which, in turn, may include a plurality fuel cells, such as a plurality of the fuel cell 150 of FIG. 4) and is configured to provide a fuel cell module direct-current power output during, e.g., an operating condition of the power source assembly 200. In particular, the fuel cell module 202 is configured to provide a fuel cell voltage output and a fuel cell module current output IFC during the operating condition of the power source assembly 200. The fuel cell module 202 may be configured to generate a maximum power output of at least 100 kilowatts (KW) and up to 2,000 kW, such as between 200 kW and 1,200 kW.

The battery 204 is configured to provide a battery direct-current power output during, e.g., the operating condition of the power source assembly 200. In particular, the battery 204 is configured to provide a battery voltage output and a battery current output $I_{BAT}$ during the operating condition of the power source assembly 200. The battery 204 may be configured in any suitable manner to store electrical power. In certain exemplary embodiments, the battery 204 may include one or more lithium-ion batteries, and/or one or more batteries of other suitable chemistry.

The battery 204 may be configured to store up to 100 kilowatt hour (kWh) or less, while the fuel cell's rated output power is 850 kW. The ratio of the rated energy of the battery 204 to the rated output power of the fuel cell can be approximately 7 minutes. Other ratios are also contemplated.

The isolated DC/DC converter 208 is in cascade electrical connection with the fuel cell module 202 to receive the fuel cell module direct-current power output. More specifically, for the embodiment depicted, the isolated DC/DC converter 208 is in direct cascade electrical connection with the fuel cell module 202. As used herein, the term "direct cascade electrical connection" refers to a cascade electrical connection between two components with no power electronics in electrical connection therebetween. In one form, the fuel cell module 202 can be in electrical connection with the fuel cell module 202 via a first DC electric bus 225 in which the fuel cell module 202 is in a direct cascade electrical connection with the isolated DC/DC converter 208 with no power electronics in electrical connection therebetween.

As discussed above, the isolated DC/DC converter 208 is configured to regulate the fuel cell module output current IFc from the fuel cell module 202. As will be appreciated, the isolated DC/DC converter 208 can take a variety of forms including a unidirectional DC/DC converter (e.g., permitting electricity flow from the fuel cell module 202 in one direction only), or can take the form of a bidirectional DC/DC converter discussed in other embodiments herein.

The controller 212 is configured to control the isolated DC/DC converter 208 based on the received data (e.g., reference numerals) by issuing control commands as indicated by reference numeral 224 to one or more discrete electric components within the isolated DC/DC converter 208. The control command 224 can represent one or more control commands useful to control the isolated DC/DC converter 208. The controller 212 can be used to control the output current IFC from the fuel cell module 202. Further description of the embodiment depicted in FIG. 5 is provided below with respect to FIG. 6.

Further, for the embodiment depicted, the controller 212 is further configured to receive data indicative of a reference power such as a reference current level or reference voltage level, as is indicated by line 226. Reference will be made herein to a reference current level 226 for ease of convenience with the depicted embodiment, but it will be appreciated that a reference power can also be provided to the controller 212. The reference current level 226 may be a desired current output for the fuel cell module 202. In some forms, line 226 can represent a reference power output for the power source assembly 200 and in which the controller 212 is configured to determine an appropriate current draw IFc resulting from control of the discrete components of the isolated DC/DC converter 208. When the reference current level indicates that the fuel cell module direct-current output IFC needs to be higher or lower than the current fuel cell module direct-current output IFC, the controller 212 may vary the control command 224 to the isolated DC/DC converter 208 to increase or decrease the fuel cell module direct-current output IFc to meet the current demands indicated by the reference current level. However, the increase and/or decrease of fuel cell module direct-current output IFc may be at a controlled rate to ensure the rate of change of the fuel cell module direct-current output IFc is sufficiently low to prevent or minimize premature wearing of the fuel cell module 202.

The control signal 224 may be data indicative of a duty cycle of a power switch. The duty cycle is a measure of the "on" time of the power switch relative to the total period of a switching cycle. By adjusting the duty cycle, the controller 212 can effectively regulate the power output of the DC/DC converter 208, ensuring that the load 214 receives the necessary power.

In such a manner, it will be appreciated that the isolated DC/DC converter 208 is operated and controlled based on the fuel cell module direct-current output IFC provided to the isolated DC/DC converter 208 from the fuel cell module 202, the reference power level, and, in some embodiments, a slew rate factor for the fuel cell module 202. The slew rate factor may be indicative of a maximum allowable slew rate for the fuel cell module 202 without the fuel cell module 202 prematurely degrading or wearing. The isolated DC/DC converter 208 may therefore control the fuel cell module 202 based on the amount of current coming out of the fuel cell module 202.

Referring still to FIG. 5, the isolated DC/DC converter 208 and the battery 204 are further in parallel electrical connection and contribute converter current output Iconv and battery current output Ibatt, respectively, to the second DC electric bus 210. As will be appreciated, the load input current Iload is the sum of converter current output Iconv and battery current output Ibatt. In this manner, the isolated DC/DC converter 208 and battery 204 provide a load input current Iload to the load 214, where the load input current Iload is formed by a converter current output Iconv. The DC/DC converter 208 regulates the FC output current, IFC. Output current of the DC/DC converter 208, Iconv, may not be regulated directly. In some embodiments, Iconv can be calculated by dividing output power of the fuel cell 202 by a voltage of the battery 204 Furthermore, the load current, Iload, may not be regulated by the DC/DC converter 208. The load current, Iload, can be any value between a minimum value and a maximum value. One or both of slew rate of FC output current IFc or a power slew rate of the fuel cell 202 can be limited, with the rest of the load current Iload from the battery 204. Sudden current/power changes demanded of, or delivered to, the battery 204 are expected. Sudden current/power changes demanded of the fuel cell 202, however, are not allowed and is limited to specific slew rate through control of the DC/DC converter 208. It will be appreciated, however, that in some forms the embodiment of FIG. 5 can also include a diode coupling the fuel cell 202 to the DC/DC converter 208 (e.g., the diode 240 illustrated in other embodiments herein).

In one embodiment of the isolated DC/DC converter 208, the fuel cell module 202 may be controlled using the controller 212 and isolated DC/DC converter 208 to react to changes in reference power levels for the power source assembly 200 without exceeding a slew rate range for the fuel cell module 202. In order to ensure power output demands are met (i.e., that a net direct-current power output to the load 214 is at a desired level), the battery 204 may provide instantaneous increases and decreases in its power to meet the increase and decrease rates of the propulsion or load power as limited by output power slew rate of the fuel cell 202. It will be appreciated that, as used herein, the term "slew rate" as it relates to a fuel cell module 202 refers to a rate of change of the fuel cell module direct-current voltage output VFC of the fuel cell module 202, expressed in a measure of power per unit of time, e.g., kilowatts per second (kW/s), volts per second (V/s), or amps per second (A/s). In certain embodiments, the isolated DC/DC converter 208 may respond relatively slowly to load power changes in several seconds (e.g., five seconds, seven seconds, ten seconds, or 15 seconds) to avoid wearing of the fuel cell 202.

The second DC electric bus 210 is further configured to provide the net direct-current power output to the load 214. The load 214, as described above, may be, e.g., an electric propulsor of an aeronautical vehicle (see, e.g., FIGS. 2 and 3). In such manner, it will be appreciated that the load 214 may include an inverter (not shown; e.g., to convert the net direct-current power output to an alternating current power output) and an electric machine to drive a propulsor.

Figure 6:
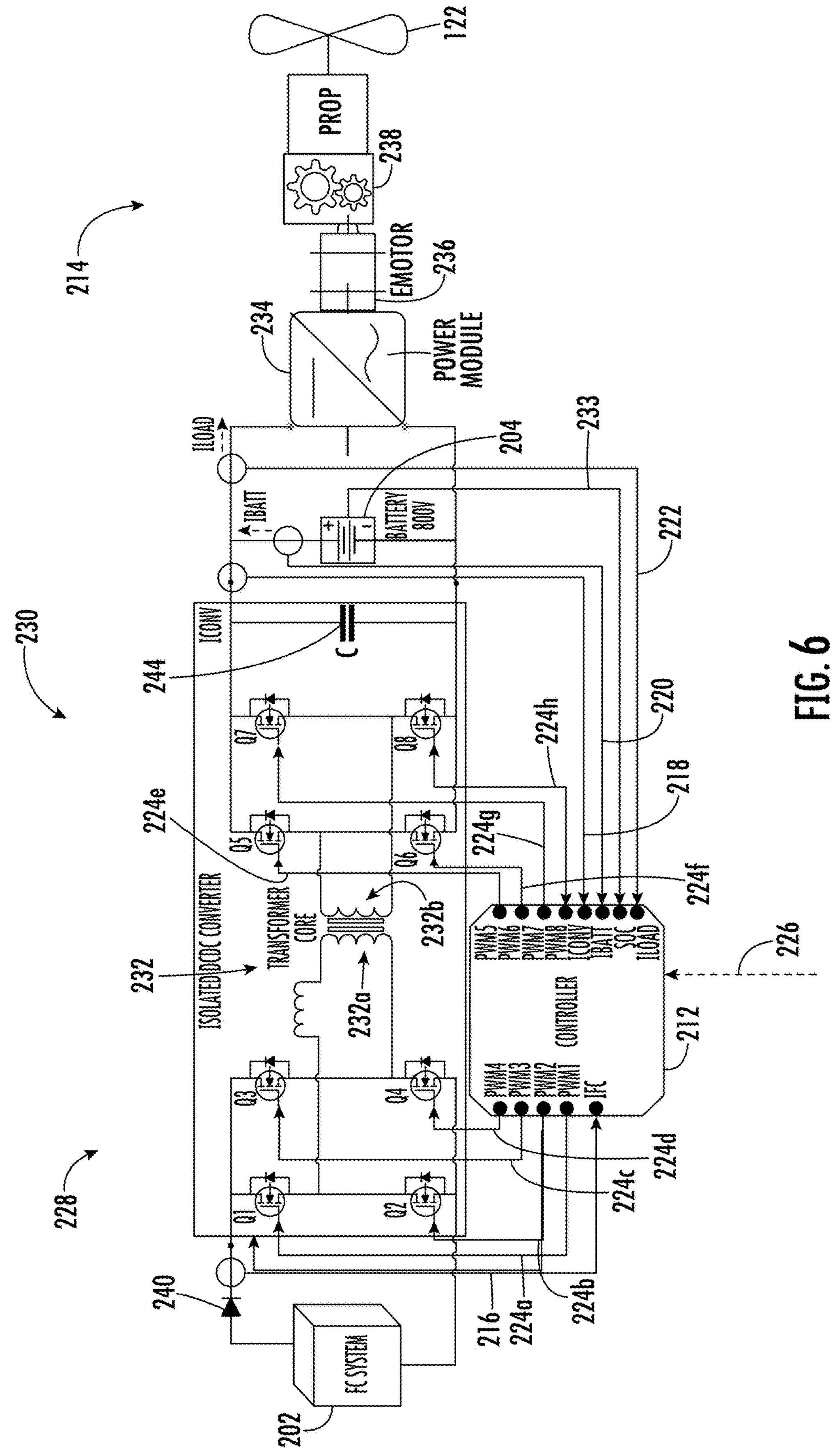
FIG. 6 is a schematic diagram of a power source assembly for an aeronautical vehicle in accordance with another exemplary aspect of the present disclosure.

Turning now to FIG. 6, another embodiment of the power source assembly 200 depicted in FIG. 5 is illustrated. The embodiment depicted in FIG. 6 illustrates the isolated DC/DC converter 208 having a dual active bridge topology which includes a DC/alternating current (AC) portion 228, an AC/DC portion 230, and a transformer 232 coupling the DC/AC portion 228 and AC/DC portion 230. The transformer 232 includes a first side winding 232*a* in electrical communication with DC/AC portion 228, and a second side winding 232*b* in electrical communication with the AC/DC portion 230. The first side winding 232*a* and second side winding 232*b* are electromagnetically coupled with each other such that a time rate of change of current flow through one of the first side winding 232*a* can induce current flow in the other. For example, a time rate of change of current flow through first side winding 232*a* creates a changing magnetic field. The changing magnetic field can induce current flow in the second side winding 232*b*. Though the first side winding 232*a* is not in electrical communication with the second side winding 232*b*, driven current in either of first side winding 232*a* and 232*b* can cause current flow in the other through the induced magnetic field.

The DC/AC portion 228 of the isolated DC/DC converter 208 includes switches Q1, Q2, Q3, and Q4 useful to convert a DC current from the fuel cell module 202 into a wave as will be appreciated by those of skill in the art. Switches Q1, Q2, Q3, and Q4 can take any variety of forms, including metal-oxide semiconductor field-effect transistors (MOSFETs) such as silicon carbide MOSFETs, and insulated-gate bipolar transistor (IGBTs). Inductor L is provided in electrical series with the first side winding 232*a* to provide a time rate of change of the current produced by the coordinated switching of Q1, Q2, Q3, and Q4. In some embodiments soft switching of Q1, Q2, Q3, and Q4 can be used to reduce switching losses. It will be appreciated that the controller 212 can regulate the state of switches Q1, Q2, Q3, and Q4 through the control command 224*a*, 224*b*, 224*c*, and 224*d* issued by the controller 212.

The DC/AC portion 228 of the isolated DC/DC converter 208 includes switches Q1, Q2, Q3, and Q4 useful to convert a DC current from the fuel cell module 202 into a wave as will be appreciated by those of skill in the art. Inductor L is provided in electrical series with the first side winding 232*a* to provide a time rate of change of the current produced by the coordinated switching of Q1, Q2, Q3, and Q4. It will be appreciated that the controller 212 can regulate the state of switches Q1, Q2, Q3, and Q4 through the control command 224*a*, 224*b*, 224*c*, and 224*d* issued by the controller 212.

The AC/DC portion 230 of the isolated DC/DC converter 208 includes switches Q5, Q6, Q7, and Q8 useful to convert an AC current induced from operation of the DC/AC converter 228 through the transformer 232 into a DC current. As with switches Q1, Q2, Q3, and Q4, switches Q5, Q6, Q7, and Q8 can take any variety of forms, including metal-oxide semiconductor field-effect transistors (MOSFETs) such as silicon carbine MOSFETs, and insulated-gate bipolar transistor (IGBTs). It will be appreciated that the controller 212 can regulate the state of switches Q5, Q6, Q7, and Q8 through the control commands 224*e*, 224*f*, 224*g*, and 224*h* issued by the controller 212.

It will be appreciated that dual active bridge topologies can be used to coordinate switching of Q1, Q2, Q3, and Q4 and Q5, Q6, Q7, and Q8, including the duration that the switches are closed to permit current flow, and the relative phasing of the switches. Such coordination can therefore be used to pull a varying amount of power from the fuel cell module 202 for use by the load 214.

The embodiment depicted in FIG. 6 also includes a power capacitor 244 connected at the output of the DC/DC converter 208 to smooth the voltage output of the DC/DC converter 208 by conducting an A/C portion of a ripple current generated by switches Q5 to Q8.

The embodiment depicted in FIG. 6 also includes the battery 204 electrically connected in parallel via the second electric bus 210 with the power capacitor 244 and AC/DC portion 230 of the isolated DC/DC converter 208. The battery 204 is also structured to communicate data indicative of a state of charge (SOC) of the battery, represented by reference numeral 233, which can include a value that represents the SOC, or can include intermediate data which can be used by the controller 212 to calculate a SOC.

The load 214 illustrated in FIG. 6 includes an inverter 234 used to convert from the DC power provided by the battery 204 and isolated DC/DC converter 208 to an AC power needed to drive an electric machine 236. The electric machine 236 is mechanically coupled, via a gearing 238, to a fan section 122 useful to provide motive power to the vehicle 100.

Of note in FIG. 6, the fuel cell module 202 is in electrical connection with the isolated DC/DC converter 208 via a diode 240 which can discourage current flow from the isolated DC/DC converter 208 to the fuel cell module 202. The diode 240 can take on a variety of forms and can be used in any other embodiments described herein. The diode 240 discourages current flow from the isolated DC/DC converter 208 to the fuel cell module 202 can also be present in other embodiments disclosed elsewhere herein, including FIG. 5.

Figure 7:
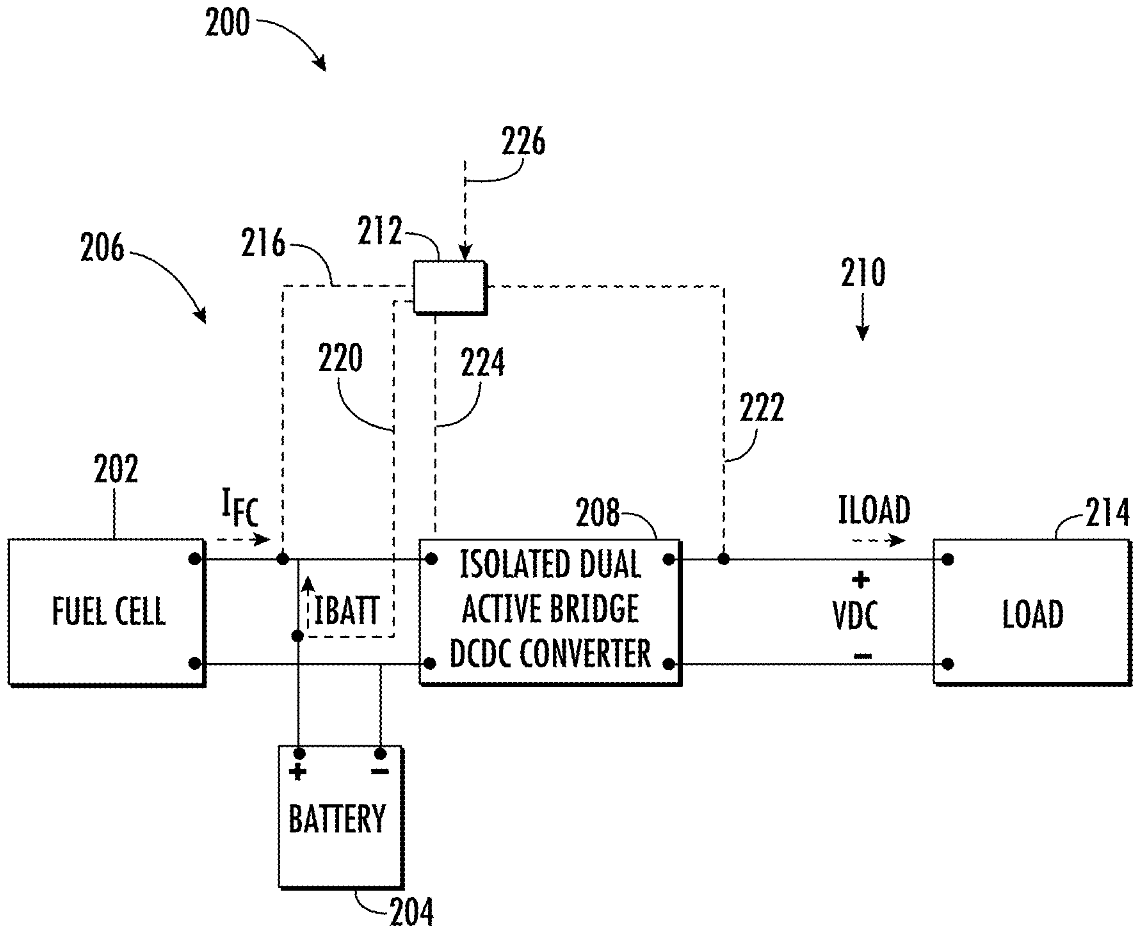
FIG. 7 is a schematic diagram of a power source assembly for an aeronautical vehicle in accordance with another exemplary aspect of the present disclosure.

Referring now to FIG. 7, a schematic diagram of a power source assembly 200 for an aeronautical vehicle in accordance with an exemplary aspect of the present disclosure is provided. The exemplary power source assembly 200 of FIG. 7 may be integrated into one or more of the exemplary aeronautical vehicles described herein (see, e.g., vehicle 100 of FIG. 1), may be used with one or more of the propulsors described herein (see, e.g., FIGS. 2 and 3), and may utilize one or more of the exemplary power sources described herein (see, e.g., FIG. 4).

More specifically, FIG. 7 schematically depicts an electric circuit for the power source assembly 200. As will be appreciated, the power source assembly 200 includes a fuel cell module 202, a battery 204, a first direct-current (DC) electric bus 206, an isolated DC/DC converter 208, and a second DC electric bus 210, and a controller 212. The isolated DC/DC converter 208 is described further below and is used in the power source assembly 200 to provide electric isolation between electrical components on either side of the isolated DC/DC converter 208, such as, for example, to electrically isolate the fuel cell module 202 from the load 214.

The power source assembly 200 can be used as part of a power assembly 215 useful to provide and deliver power to the fan 146. The power assembly 215 can include one or more devices useful to convert electric power to mechanical power which, in the illustrated embodiment of FIG. 3, includes the inverter 142 and electric machine 144. It will be appreciated that in the depiction of FIG. 3, the electric power distribution bus 118 can be the second DC electric bus 210 of FIG. 7.

Briefly, it will further be appreciated that for the embodiment depicted, the power source assembly 200 includes a controller 212 operably coupled to the isolated DC/DC converter 208 and configured to receive data indicative of operation of one or more components of the power source assembly 200. In the illustrated form, the isolated DC/DC converter 208 is configured to receive fuel cell module current output IFC indicated by line 216, a battery current output Ibatt indicated by line 220, and a load input current Iload indicated by line 222. Any of the current outputs depicted in FIG. 7 can be measured using a suitable sensor or estimated. As will be appreciated, the load input current Iload is the same as the converter current output. In other embodiments, the data received by the controller 212 may alternatively and/or additionally include voltage output of any of the fuel cell module 202, battery 204, and isolated DC/DC converter 208. Further, the controller 212 may be configured to receive data indicative of load voltage associated with the load 214. In some embodiments, the isolated DC/DC converter 208 can be configured to determine power of any given component based on sensed current and voltage from any variety of the components depicted. For example, the isolated DC/DC converter 208 can calculate power output from the fuel cell module 202 based on sensed current IFC via data line 216 and voltage (e.g., using a voltage measurement across the terminals of the fuel cell module 202).

In contrast with FIG. 5, the isolated DC/DC converter 208 is in electrical communication with the fuel cell module 202 and the battery 204 via the first electric bus 206. The fuel cell module 202 and the battery 204 are in parallel electric connection and communicate IFC and Ibatt to the DC/DC converter 208.

As discussed above, the isolated DC/DC converter 208 can be configured to regulate the fuel cell module output current IFc from the fuel cell module 202. As will be appreciated, the isolated DC/DC converter 208 can take a variety of forms including a unidirectional DC/DC converter (e.g., permitting electricity flow from the fuel cell module 202 in one direction only), or can take the form of a bidirectional DC/DC converter discussed in other embodiments herein.

The controller 212 is configured to control the isolated DC/DC converter 208 based on the received data (e.g., reference numerals) by issuing control commands as indicated by reference numeral 224 to one or more discrete electric components within the isolated DC/DC converter 208. The control command 224 can represent one or more control commands useful to control the isolated DC/DC converter 208. The controller 212 can be used to control the output current IFC from the fuel cell module 202. Further description of the embodiment depicted in FIG. 7 is provided below with respect to FIG. 8.

Further, for the embodiment depicted, the controller 212 is further configured to receive data indicative of a reference power such as a reference current level or reference voltage level, as is indicated by line 226. Reference will be made herein to a reference current level 226 for ease of convenience with the depicted embodiment, but it will be appreciated that a reference power can also be provided to the controller 212. The reference current level 226 may be a desired current output for the fuel cell module 202. In some forms, line 226 can represent a reference power output for the power source assembly 200 and in which the controller 212 is configured to determine an appropriate current draw IFc resulting from control of the discrete components of the isolated DC/DC converter 208. When the reference current level indicates that the fuel cell module direct-current output IFc needs to be higher or lower than the current fuel cell module direct-current output IFC, the controller 212 may vary the control command 224 to the isolated DC/DC converter 208 to increase or decrease the fuel cell module direct-current output IFC to meet the current demands indicated by the reference current level. However, the increase and/or decrease of fuel cell module direct-current output IFc may be at a controlled rate to ensure the rate of change of the fuel cell module direct-current output IFC is sufficiently low to prevent or minimize premature wearing of the fuel cell module 202.

The control signal 224 may be data indicative of a duty cycle of a power switch. The duty cycle is a measure of the "on" time of the power switch relative to the total period of a switching cycle. By adjusting the duty cycle, the controller 212 can effectively regulate the power output of the fuel cell DC/DC converter 208, ensuring that the load 214 receives the necessary power.

In such a manner, it will be appreciated that the isolated DC/DC converter 208 is configured to meet sudden power demands of the load 214, therefore it may not be able to control the fuel cell output current slew rate, in contrast to the topology in FIG. 5. For this reason, the DC/DC converter in FIG. 7 and FIG. 5 may not work in the same manner. One method of slowing down the FC output current slew rate during load transients is to use sufficiently large battery. Therefore, compared to the energy size of the battery in FIG. 5, the battery in FIG. 7 is relatively larger in energy size.

Referring still to FIG. 7, the isolated DC/DC converter 208 is in direct cascade electric connection with the load 214, which can occur through second electric bus 210.

In one embodiment of the isolated DC/DC converter 208, the fuel cell module 202 may be controlled using the controller 212 and isolated DC/DC converter 208 to react to changes in reference power levels for the power source assembly 200 without exceeding a slew rate range for the fuel cell module 202. In order to ensure power output demands are met (i.e., that a net direct-current power output to the load 214 is at a desired level), the battery 204 may provide instantaneous increases and decreases in its power to meet the increase and decrease rates of the propulsion or load power as limited by the isolated DC/DC converter 208 closed loop response. In certain embodiments, the isolated DC/DC converter 208 may respond relatively fast to load power changes in less than 10 milli seconds (ms), such as in less than 5 ms.

Figure 8:
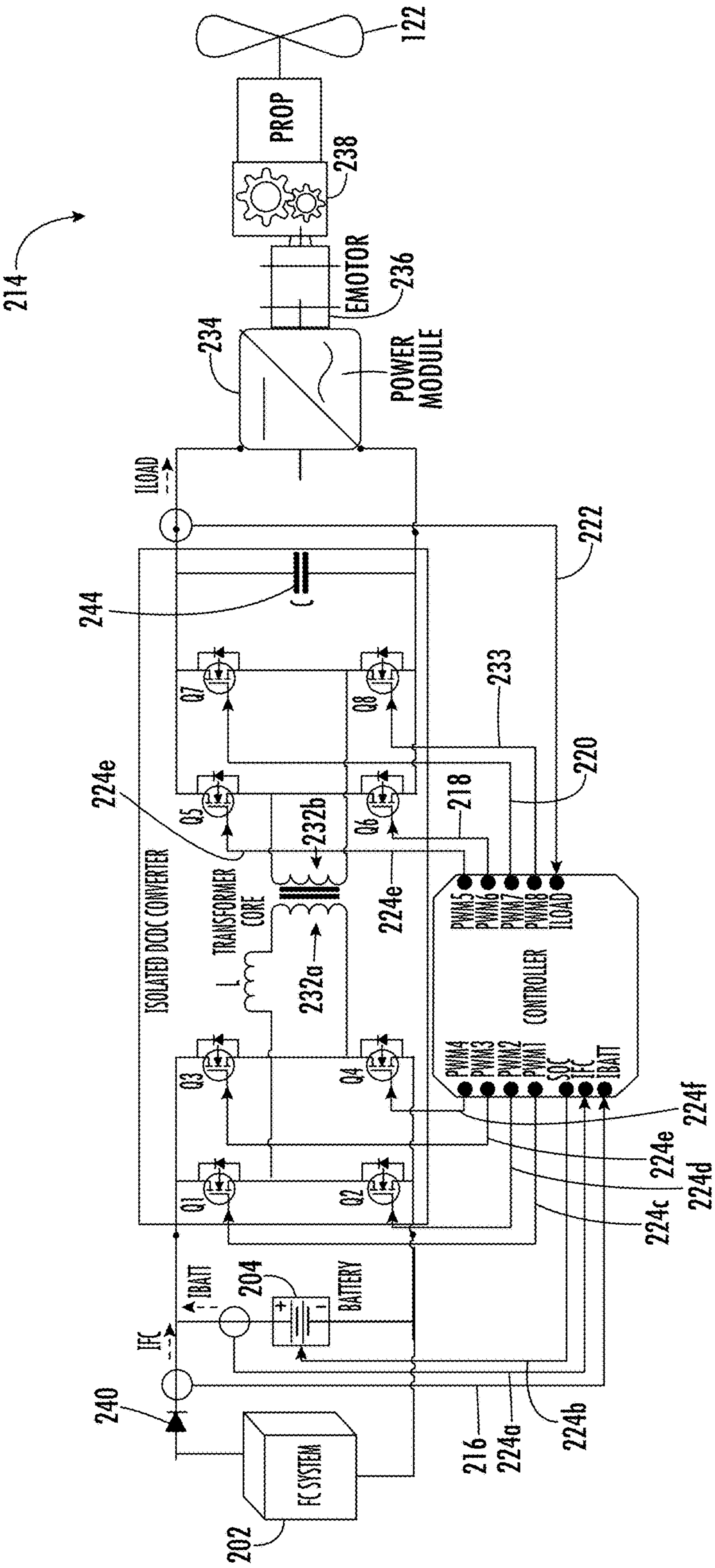
FIG. 8 is a schematic diagram of a power source assembly for an aeronautical vehicle in accordance with another exemplary aspect of the present disclosure.

Turning now to FIG. 8, another embodiment of the power source assembly 200 depicted in FIG. 7 is illustrated. The embodiment depicted in FIG. 8 illustrates the isolated DC/DC converter 208 having a dual active bridge topology which includes a DC/AC portion 228, an AC/DC portion 230, and a transformer 232 coupling the DC/AC portion 228 and AC/DC portion 230. The transformer 232 includes a first side winding 232*a* in electrical communication with DC/AC portion 228, and a second side winding 232*b* in electrical communication with the AC/DC portion 230. The first side winding 232*a* and second side winding 232*b* are electromagnetically coupled with each other such that a time rate of change of current flow through one of the first side winding 232*a* can induce current flow in the other. For example, a time rate of change of current flow through first side winding 232*a* creates a changing magnetic field. The changing magnetic field can induce current flow in the second side winding 232*b*. Though the first side winding 232*a* is not in electrical communication with the second side winding 232*b*, driven current in either of first side winding 232*a* and 232*b* can cause current flow in the other through the induced magnetic field.

The DC/AC portion 228 of the isolated DC/DC converter 208 includes switches Q1, Q2, Q3, and Q4 useful to convert a DC current from the fuel cell module 202 into a wave as will be appreciated by those of skill in the art. Switches Q1, Q2, Q3, and Q4 can take any variety of forms, including metal-oxide semiconductor field-effect transistors (MOSFETs) such as silicon carbide MOSFETs, and insulated-gate bipolar transistor (IGBTs). Inductor L is provided in electrical series with the first side winding 232*a* to provide a time rate of change of the current produced by the coordinated switching of Q1, Q2, Q3, and Q4. In some embodiments soft switching of Q1, Q2, Q3, and Q4 can be used to reduce switching losses. It will be appreciated that the controller 212 can regulate the state of switches Q1, Q2, Q3, and Q4 through the control command 224*a*, 224*b*, 224*c*, and 224*d* issued by the controller 212.

The AC/DC portion 230 of the isolated DC/DC converter 208 includes switches Q5, Q6, Q7, and Q8 useful to convert an AC current induced from operation of the DC/AC converter 228 through the transformer 232 into a DC current. As with switches Q1, Q2, Q3, and Q4, switches Q5, Q6, Q7, and Q8 can take any variety of forms, including metal-oxide semiconductor field-effect transistors (MOSFETs) such as silicon carbide MOSFETs, and insulated-gate bipolar transistor (IGBTs). It will be appreciated that the controller 212 can regulate the state of switches Q5, Q6, Q7, and Q8 through the control commands 224*e*, 224*f*, 224*g*, and 224*h* issued by the controller 212.

It will be appreciated that dual active bridge topologies can be used to coordinate switching of Q1, Q2, Q3, and Q4 and Q5, Q6, Q7, and Q8, including the duration that the switches are closed to permit current flow, and the relative phasing of the switches. Such coordination can therefore be used to pull a varying amount of power from the fuel cell module 202 for use by the load 214.

The embodiment depicted in FIG. 8 also includes a power capacitor 244 in parallel electric connection with the isolated DC/DC converter 208. The power capacitor 244 is connected at the output of the DC/DC converter 208 to smooth the voltage output of the DC/DC converter 208 by conducting an AC portion of a ripple current generated by switches Q5 to Q8

Unlike the embodiment in FIG. 6, the embodiment depicted in FIG. 8 includes the battery 204 electrically connected in parallel with the fuel cell module 202 via first electric bus 206. The battery 204 is also structured to communicate data indicative of a state of charge (SOC) of the battery, represented by reference numeral 232, which can include a value that represents the SOC, or can include intermediate data which can be used by the controller 212 to calculate a SOC.

The load 214 illustrated in FIG. 8 includes an inverter 234 used to convert from the DC power provided by the battery 204 and isolated DC/DC converter 208 to an AC power needed to drive an electric machine 236. The electric machine 236 is mechanically coupled, via a gearing 238, to a fan section 122 useful to provide motive power to the vehicle 100.

Of note in FIG. 8, the fuel cell module 202 is in electrical connection with the isolated DC/DC converter 208 via a diode 240 which can discourage current flow from the isolated DC/DC converter 208 to the fuel cell module 202. The diode 240 can take on a variety of forms and can be used in any other embodiments described herein. As also suggested above, the diode 240 discourages current flow from the isolated DC/DC converter 208 to the fuel cell module 202 can also be present in other embodiments disclosed elsewhere herein, including FIG. 7.

Figure 9:
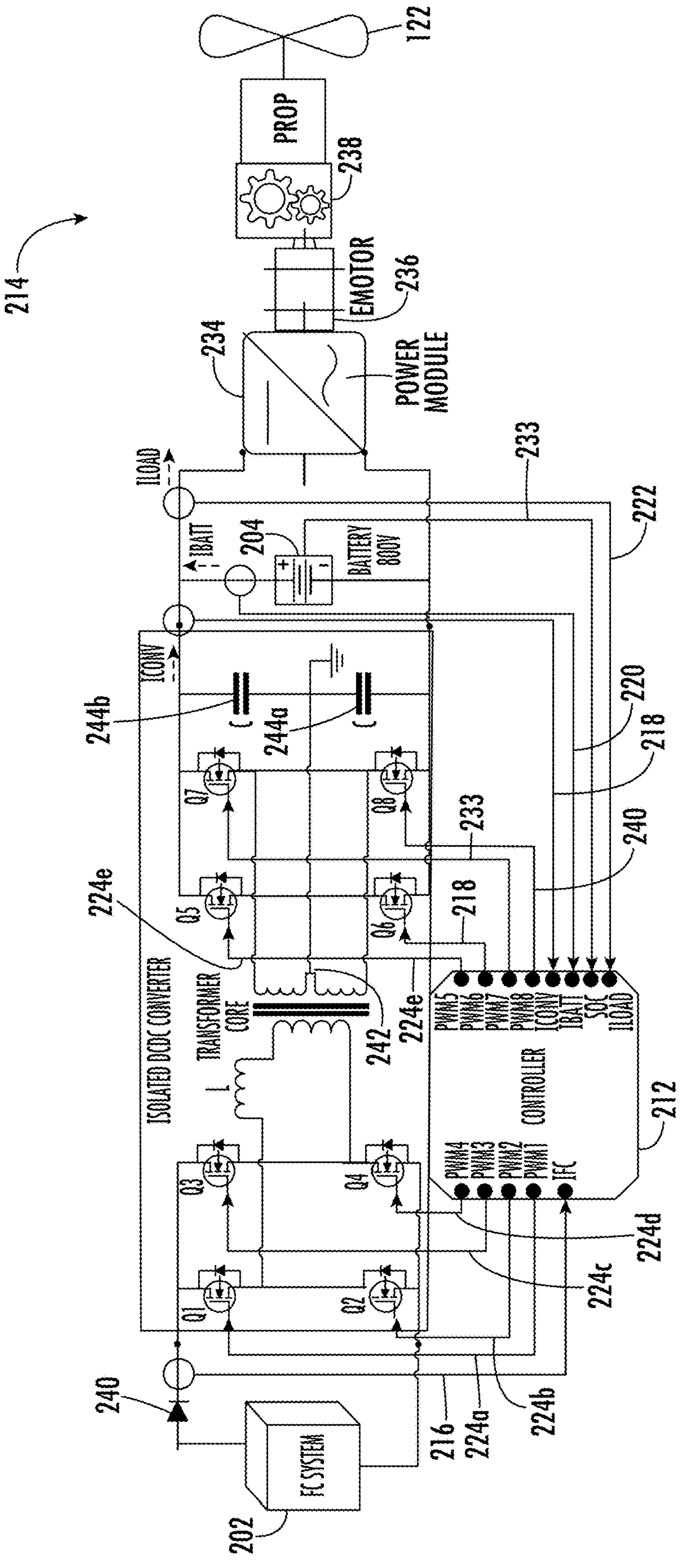
FIG. 9 is a schematic diagram of a power source assembly for an aeronautical vehicle in accordance with yet another exemplary aspect of the present disclosure.

FIG. 9 represents an embodiment of power source assembly 200 capable of providing bi-polar voltage at the input of the inverter 234. FIG. 9 includes a topology similar to FIG. 6, with the exception of a center tap 242 provided in FIG. 9, and with the exception that the power capacitor 244 has been replaced by power capacitor 244*a* and 244*b*.

Figure 10:
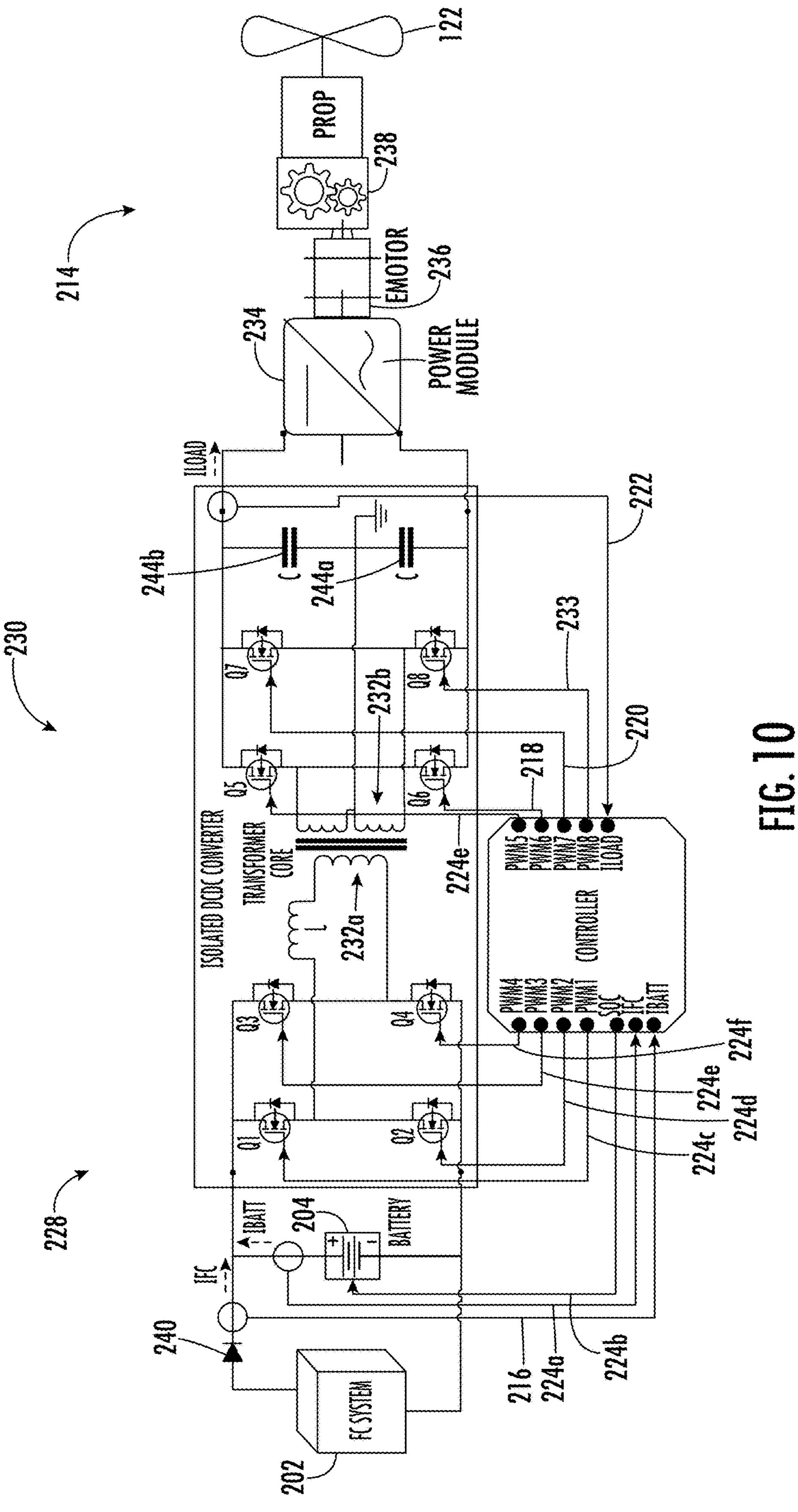
FIG. 10 is a schematic diagram of a power source assembly for an aeronautical vehicle in accordance with still another exemplary aspect of the present disclosure.

FIG. 10 represents an embodiment of power source assembly 200 capable of providing bi-directional power flow and bipolar voltage at the input of the inverter 234. FIG. 10 includes a topology similar to FIG. 8, with the exception of a center tap 242 provided in FIG. 10, and with the exception that the power capacitor 244 has been replaced by power capacitor 244*a* and 244*b*.

Figure 11:
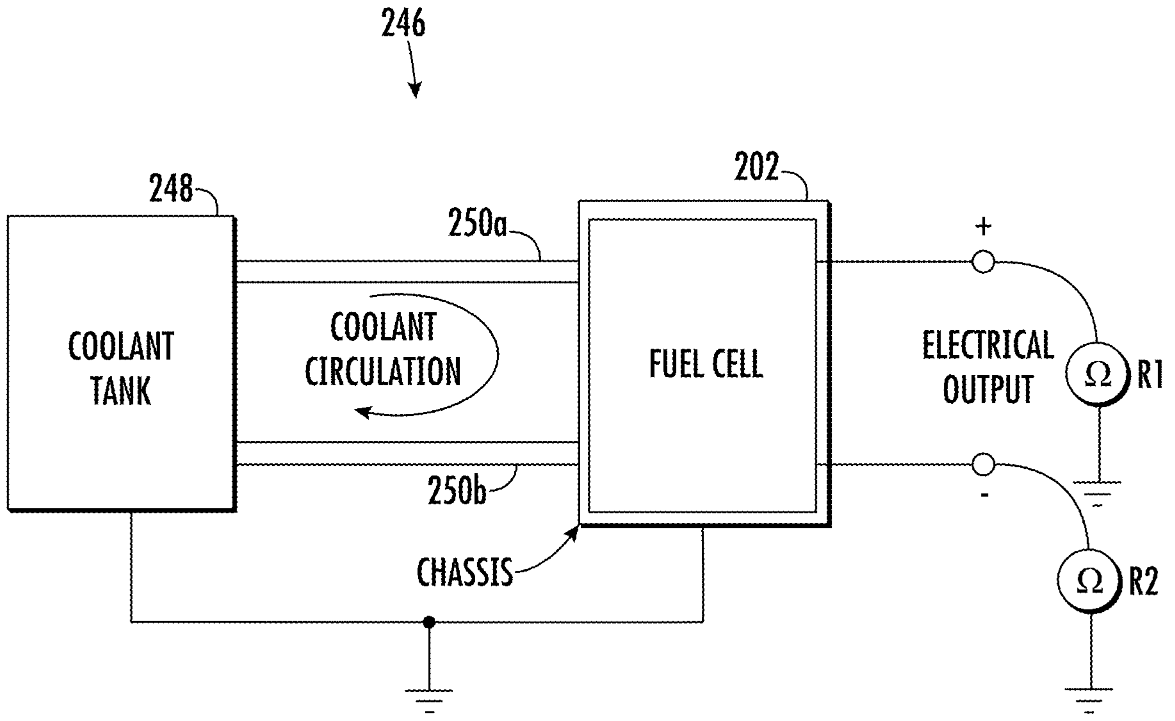
FIG. 11 is schematic diagram of a fuel cell coupled in fluid communication with a coolant tank in accordance with still another exemplary aspect of the present disclosure.

FIG. 11 depicts one embodiment of the fuel cell module 202 coupled with a cooling system 246 that includes a coolant tank 248 and conduit 250*a* and 250*b* which can convey coolant between the coolant tank 248 and fuel cell module 202. The fuel cell module 202 and coolant tank 248 are depicted as having been co-grounded to a common location with respect to the vehicle 100. The terminals of the fuel cell module 202 are depicted in FIG. 11 as being connected to an ohm-meter to measure resistance of each of the fuel cell 202 terminals measures with respect to ground. FIG. 11 is provided to illustrate the importance of the isolated DC/DC converter 208 in which the transformer 232 provides galvanic isolation. Electrically isolating the fuel cell module 202 via the isolated DC/DC converter 208 can aid in decreasing the shock hazard for personnel in contact with components of the power assembly 215, as well as increase performance of the fuel cell module 202. The electrical resistances R1 and R2 to ground depicted in the diagram should be higher than a resistance threshold to ensure that conductance of the coolant is sufficiently low. The electrical isolation provided by the transformer 232 of the DC/DC converter 208 aids in providing the relatively high resistance to ground.

Figure 12:
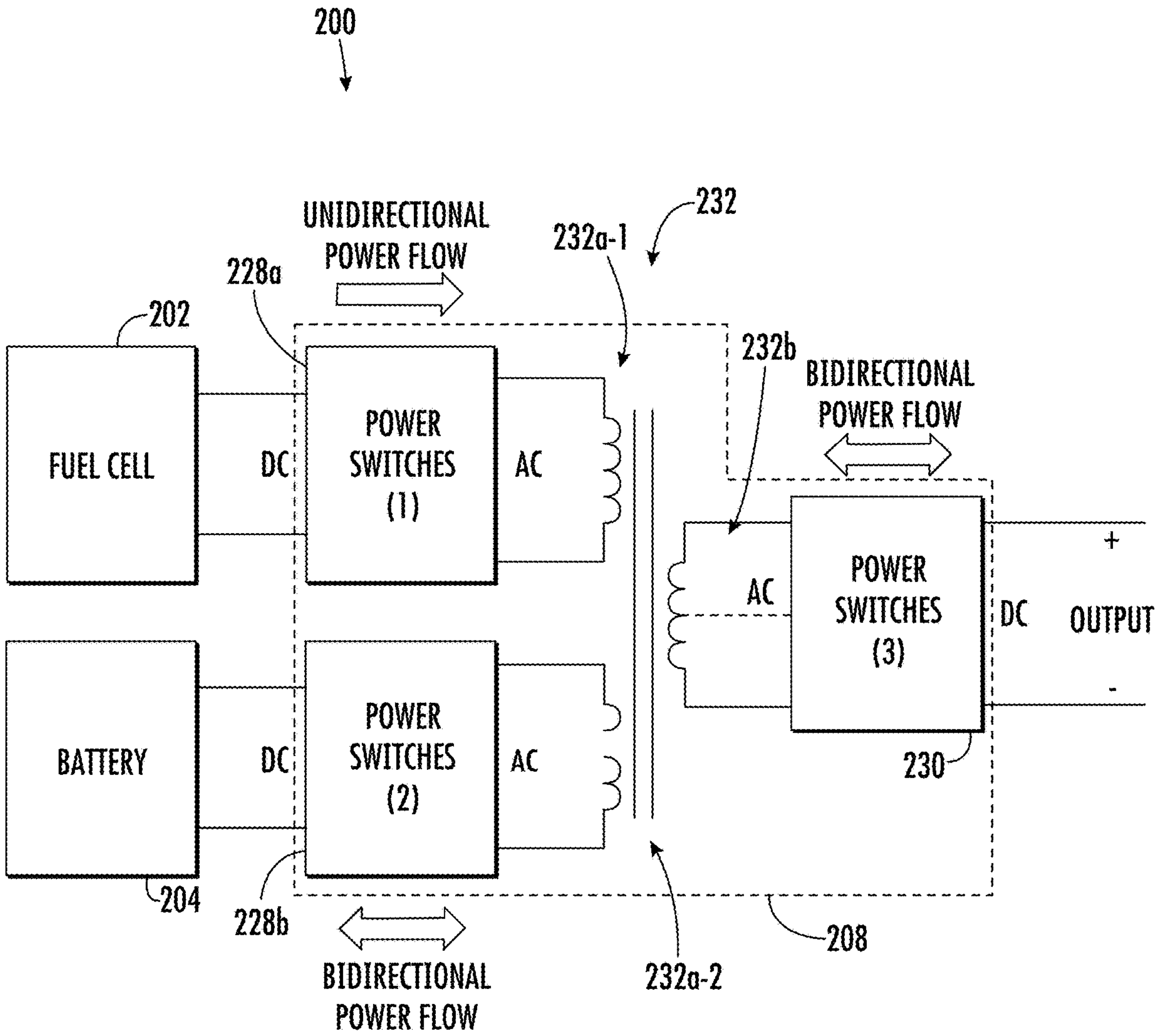
FIG. 12 is a schematic diagram of a power source assembly for an aeronautical vehicle in accordance with another exemplary aspect of the present disclosure.
Figure 13A:
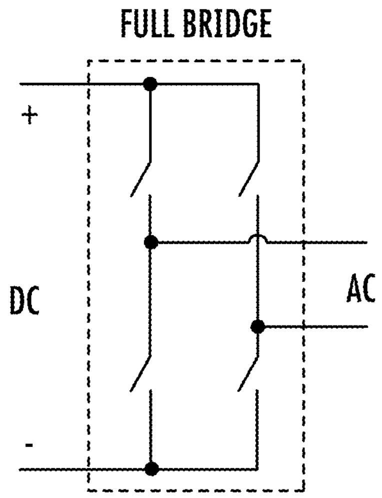
FIGS. 13*a*-13*c* is a schematic diagram of topologies useful in the embodiment of FIG. 12 in accordance with another exemplary aspect of the present disclosure.
Figure 13B:
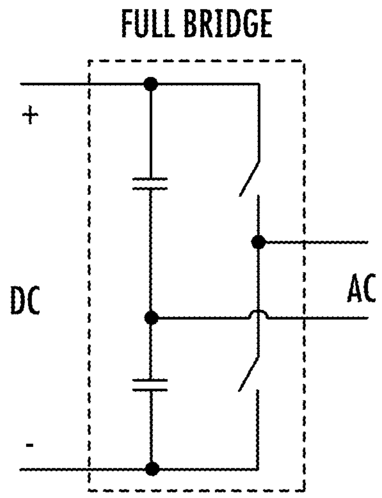
Figure 13C:
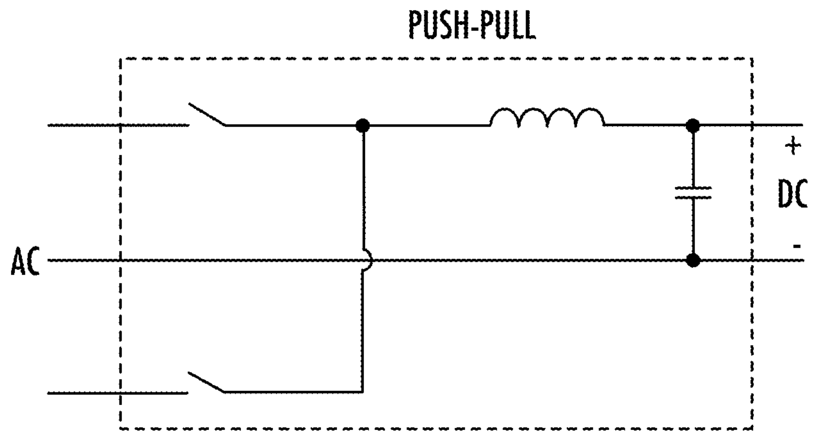

FIG. 12 depicts an embodiment of the power source assembly 200 in which the DC/AC portion 228*a* and DC/AC portion 228*b*, as well as the AC/DC portion 230, can take on a variety of forms. Notable in FIG. 12 is the location of the battery 204 connected to a dedicated converter 228*b* and isolated through the winding 232*a*-2. Also notable is the configuration of the transformer 232. Unlike FIGS. 6 and 8 where the battery 204 was electrically connected to the input or output of the DC/DC converter 208, the embodiment of FIG. 12 depicts each of the fuel cell module 202 having its own DC/AC portion 228*a* with its own first side winding 232*a*-1, and battery 204 having its own DC/AC portion 228*b* with its own first side winding 232*a*-2. Each of the DC/AC portion 228*a* and 228*b* are referred to as "Power Switches (1)" and "Power Switches (2)," while AC/DC portion 230 is referred to as "Power Switches (3)." Each of "Power Switches (1)," "Power Switches (2)," and "Power Switches (3)" can take on a variety of forms which correspond to various topologies in FIGS. 13*a*-13*c*. FIG. 13*a* corresponds to a full bridge topology, FIG. 13*b* corresponds to a half bridge topology, and FIG. 13*c* corresponds to a push-pull topology. Each of the respective topologies can be found in Table 1 below which relates the variations contemplated for each of "Power Switches (1)," "Power Switches (2)," and "Power Switches (3)." For example, "Power Switches (1)," which corresponds to DC/AC portion 228*a* in FIG. 12, can take the form of either a full bridge topology (FIG. 13*a*) or half bridge topology (FIG. 13*b*). It should be noted that each of the topologies depicted in FIGS. 13*a*-13*c* indicate a DC side and an AC side. It will be appreciated, given the indication of a DC side and an AC side, that application of the topology to AC/DC portion 230 in FIG. 12 will involve appropriate configuration to ensure the DC side of any of FIGS. 13*a*-13*c* are connected to the DC side of the AC/DC portion 230, and that the AC side of any of FIGS. 13*a*-13*c* are connected to the AC side of the AC/DC portion 230.

TABLE 1

| | Power Switch Topology | | |
|---|---|---|---|
| Converter Topology | Power Switches (1) | Power Switches (2) | Power Switches (3) |
| Dual Active Bridge (DAB) DC/DC Converter | Full Bridge/ Half Bridge | Full Bridge/ Half Bridge | Full Bridge/ Half Bridge |
| Half Bridge/Full Bridge DC/DC Converter | Full Bridge/ Half Bridge | Full Bridge/ Half Bridge | Push-pull |

As suggested above, one or more diodes (e.g., diode 240 as depicted in FIGS. 5 and 7) to discourage current flow from one or more of the isolated DC/DC converters 208 to one or more respective fuel cell modules 202 can also be present in FIG. 12.

Figure 14:
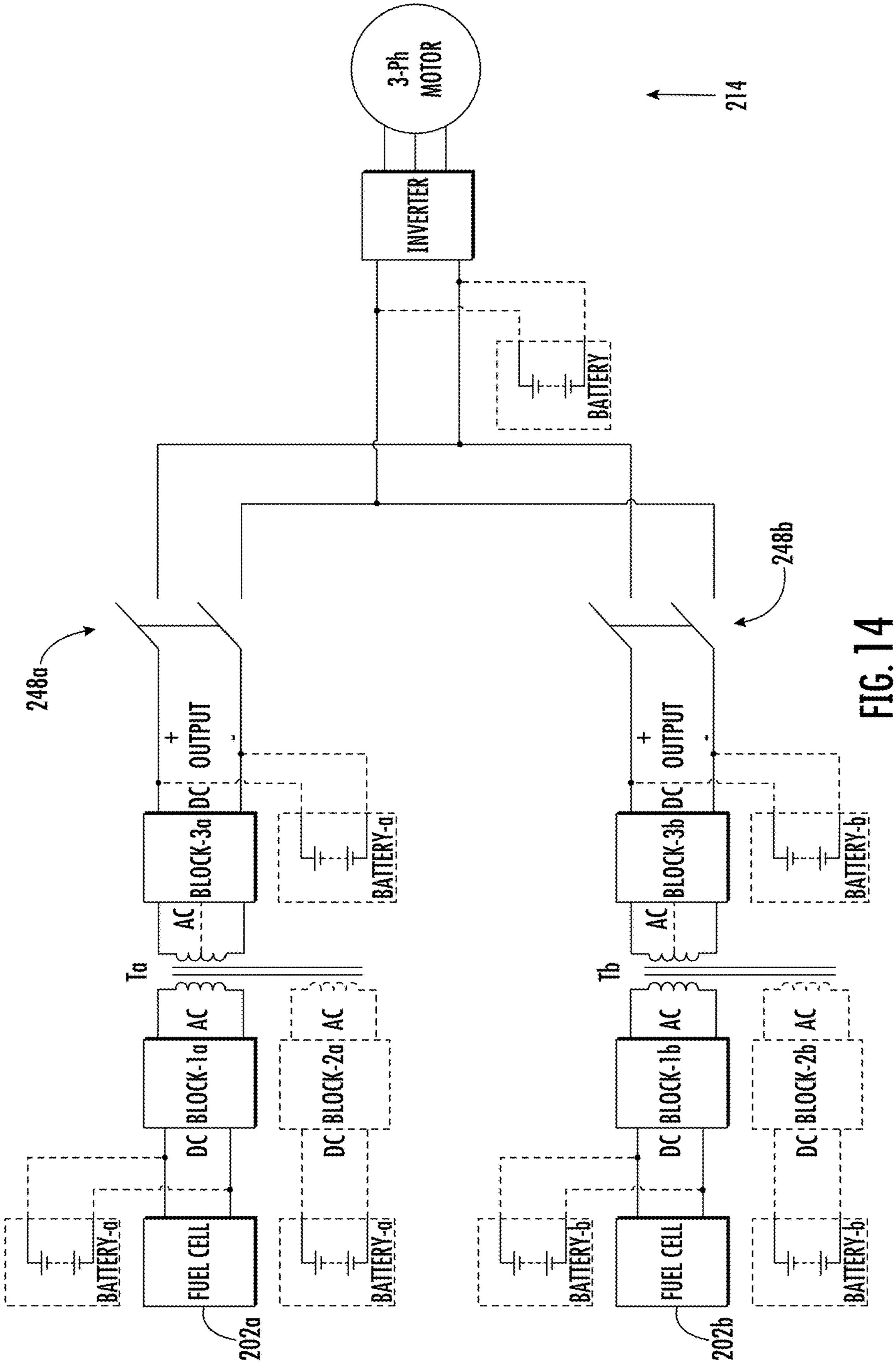
FIG. 14 is a schematic diagram of a power source assembly for an aeronautical vehicle in accordance with another exemplary aspect of the present disclosure.
Figure 15:
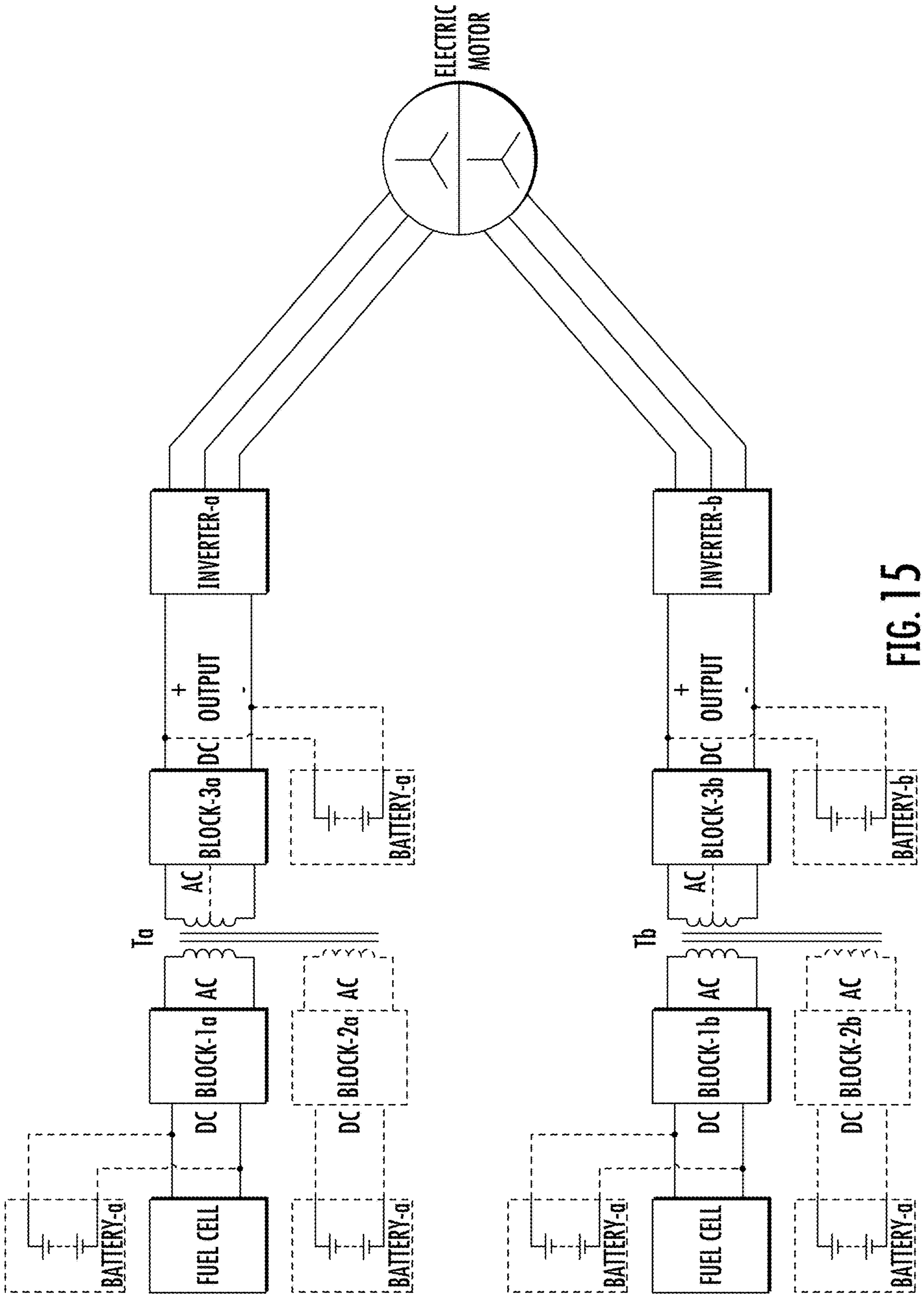
FIG. 15 is a schematic diagram of a power source assembly for an aeronautical vehicle in accordance with another exemplary aspect of the present disclosure.

FIGS. 14 and 15 depict yet further variations of the power source assembly 200 used with the power assembly 215. Dashed lines in FIGS. 14 and 15 indicate potential location of the battery 204 which is in keeping with the variations discussed above.

FIG. 14 depicts a first fuel cell module 202*a* and a second fuel cell module 202*b* which can work together to provide redundancy to the power source assembly 200. For example, in case of failure of fuel cell module 202*a*, cutover switch 248*a* and cutover switch 248*b* can be used to place fuel cell module 202*b* in power communication with the load 214. Of note, FIG. 14 also depicts a battery 204 connected between the cutover switch 248*a* and cutover switch 248*b* as another additional and/or alternative location. FIG. 14 can be suitable for electric machine 236 having distributed windings. As suggested above, one or more diodes (e.g., diode 240 as depicted in FIGS. 5 and 7) to discourage current flow from one or more of the isolated DC/DC converters 208 to one or more respective fuel cell modules 202 can also be present in FIG. 14.

FIG. 15 depicts a first fuel cell module 202*a* and a second fuel cell module 202*b* which can work together to provide power to load 214. FIG. 15 can be suitable for electric machine 236 having concentrated windings. As suggested above, one or more diodes (e.g., diode 240 as depicted in FIGS. 5 and 7) to discourage current flow from one or more of the isolated DC/DC converters 208 to one or more respective fuel cell modules 202 can also be present in FIG. 15.

Various combinations of components are contemplated herein. For example, the diode 240 present in FIG. 5 is contemplated for use with the fuel cell 202 in any other suitable embodiments, including FIGS. 12, 14, and 15.

Figure 16:
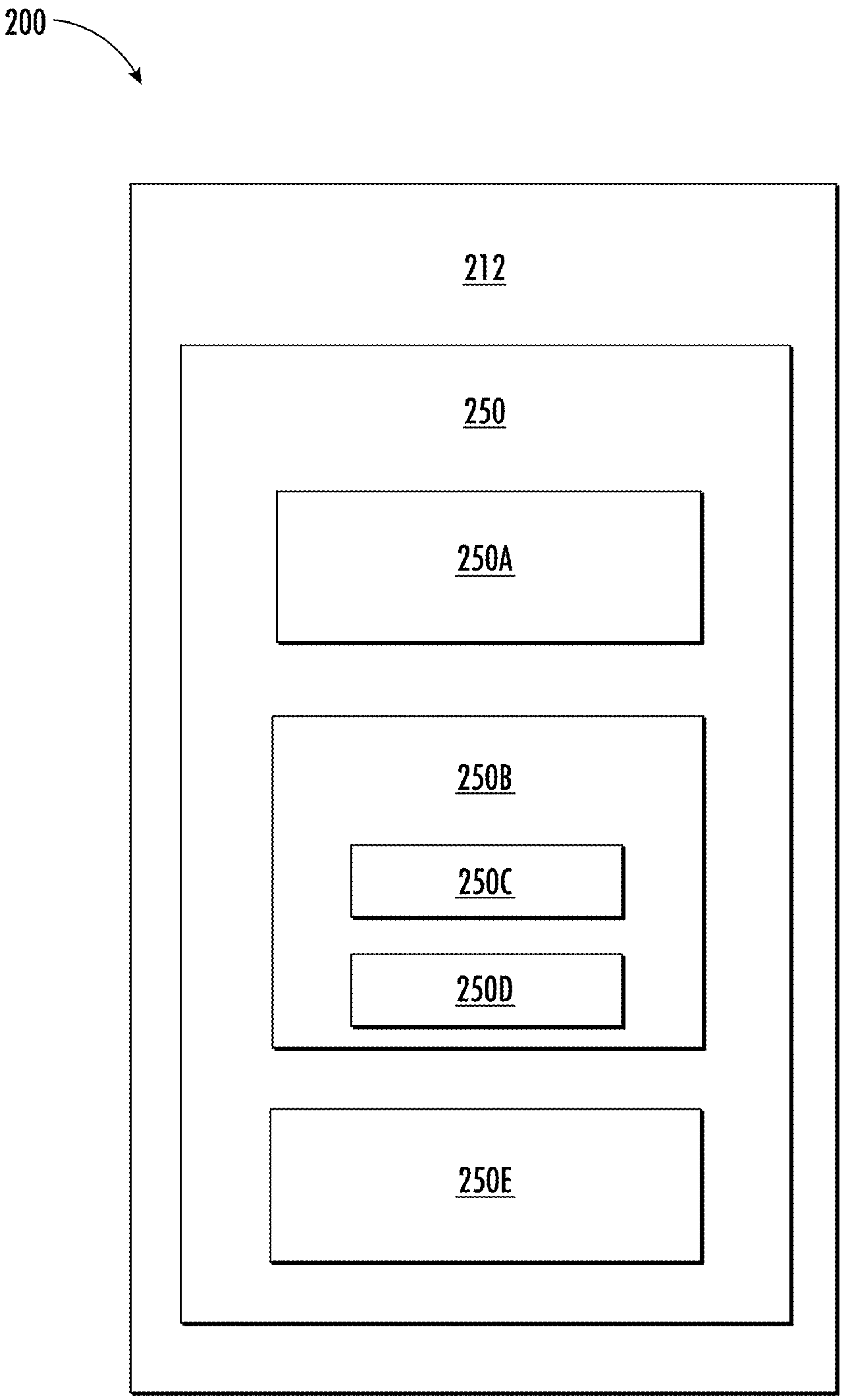
FIG. 16 is a schematic diagram of a computing device in accordance with another exemplary aspect of the present disclosure.

Turning now to FIG. 16, any of the controllers described herein (e.g., the controller 212) can be implemented using a computing device 250, one embodiment of which is illustrated in FIG. 16. For purposes of illustration, FIG. 16 depicts the microcontroller 216, but the description is applicable to any other controller discussed herein. The computing device(s) 250 can include one or more processor(s) 250A and one or more memory device(s) 250B. The one or more processor(s) 250A can include any suitable processing device, such as a microprocessor, microcontroller, integrated circuit, logic device, and/or other suitable processing device. The one or more memory device(s) 250B can include one or more computer-readable media, including, but not limited to, non-transitory computer-readable media, RAM, ROM, hard drives, flash drives, and/or other memory devices.

The one or more memory device(s) 250B can store information accessible by the one or more processor(s) 250A, including computer-readable instructions 250C that can be executed by the one or more processor(s) 250A. The instructions 250C can be any set of instructions that when executed by the one or more processor(s) 250A, cause the one or more processor(s) 250A to perform operations. In some embodiments, the instructions 250C can be executed by the one or more processor(s) 250A to cause the one or more processor(s) 250A to perform operations, such as any of the operations and functions for which the controller and/or the computing device(s) 250 are configured, the operations for any of the aforementioned systems such as the valve 223, etc., as described herein, and/or any other operations or functions of the one or more computing device(s) 250 (e.g., as a full authority digital engine controller). The instructions 250C can be software written in any suitable programming language or can be implemented in hardware. Additionally, and/or alternatively, the instructions 250C can be executed in logically and/or virtually separate threads on the one or more processor(s) 250A. The one or more memory device(s) 250B can further store data 250D that can be accessed by the one or more processor(s) 250A. For example, the data 250D can include data indicative of outside air conditions, power flows, data indicative of engine/aircraft operating conditions, and/or any other data and/or information described herein.

The computing device(s) 250 can also include a network interface 250E used to communicate, for example, with the other components of the systems described herein (e.g., via a communication network). The network interface 250E can include any suitable components for interfacing with one or more network(s), including for example, transmitters, receivers, ports, controllers, antennas, and/or other suitable components. One or more devices can be configured to receive one or more commands from the computing device (s) 250 or provide one or more commands to the computing device(s) 250.

The network interface 250E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 17:
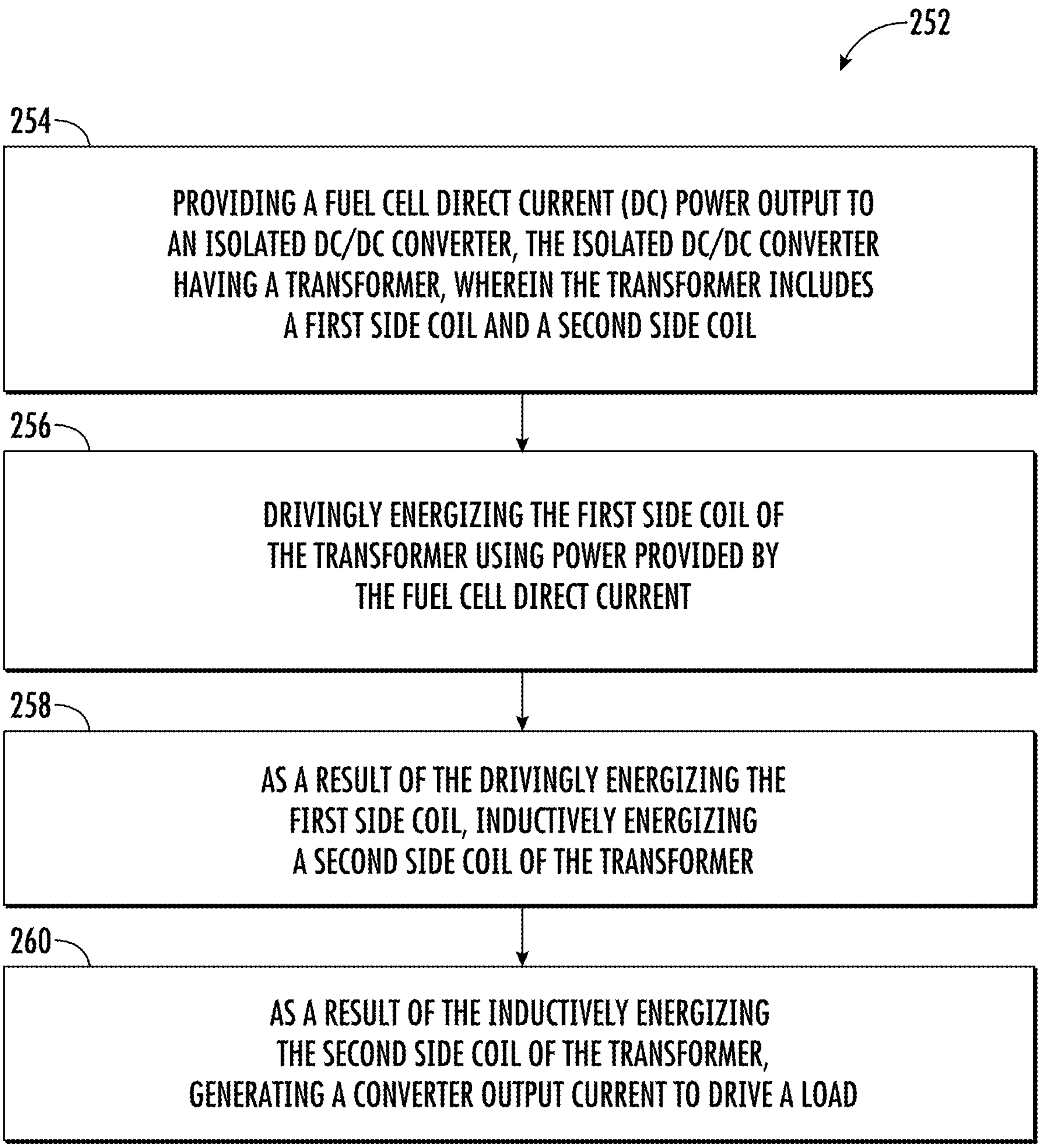
FIG. 17 is a flow diagram of a method for controlling a power source assembly of the present disclosure.

FIG. 17 discloses a method 252 for switching power which includes, at step 254, of providing a fuel cell direct current (DC) power output to an isolated DC/DC converter 208, the isolated DC/DC converter 208 having a transformer 232, wherein the transformer 232 includes a first side coil 232*a* and a second side coil 232*b*. As mentioned above, the isolated DC/DC converter 208 can include a variety of topologies suitable to provide DC/DC electric conversion. In one form, the DC/DC converter 208 can include a DC/AC portion 228 and a AC/DC portion 230. The DC/AC portion 228 and AC/DC portion 230 can each have topology independent from each other. For example, the DC/AC portion 228 can include either a full bridge topology (e.g., FIG. 13*a*) or a half bridge topology (e.g., FIG. 13*b*). The AC/DC portion 230 can include a full bridge topology (e.g., FIG. 13*a*), a half bridge topology (e.g., FIG. 13*b*), or a push pull topology (e.g., FIG. 13*c*). At step 256, the method 252 further includes drivingly energizing the first side coil 232*a* of the transformer 232 using power provided by the fuel cell direct current. At step 258, the method 252 further includes, as a result of the drivingly energizing the first side coil 232*a*, inductively energizing a second side coil 232*b* of the transformer. At step 260, the method 252 further includes, as a result of the inductively energizing the second side coil 232*b* of the transformer 232, generating a converter output current to drive a load 214.

Further aspects are provided by the subject matter of the following clauses:

A power assembly for an aeronautical vehicle, the power assembly comprising: a fuel cell module configured to provide a fuel cell direct current (DC) power output; a power load configured to receive a load power input, the power load in power communication with the fuel cell; and a DC/DC converter configured to provide a powered coupling between the fuel cell and the power load so as to place the power load in power communication with the fuel cell, the DC/DC converter having: a DC/AC portion in electric communication with the fuel cell and configured to receive the fuel cell DC power output; an AC/DC portion in electric communication with the power load and configured to provide the load power input; and a transformer inductively coupling the DC/AC portion with the AC/DC portion; wherein the transformer of the DC/DC converter provides electric isolation between the DC/AC portion and the AC/DC portion.

The power assembly of the preceding clause, wherein the DC/DC converter is configured as a dual active bridge DC/DC topology.

The power assembly of any preceding clause, further comprising a coolant tank having a working fluid coolant, wherein the coolant tank is in fluid communication with the fuel cell such that the working fluid coolant is conveyed from the coolant tank to the fuel cell to thermally cool the fuel cell.

The power assembly of any preceding clause, wherein the fuel cell module is mechanically connected to a fuel cell chassis, wherein the fuel cell chassis and the coolant tank are grounded to a common ground, wherein the fuel cell module includes a first fuel cell terminal and a second fuel cell terminal.

The power assembly of any preceding clause, wherein the power load includes an electric motor having an electric motor winding, when a resistance from a first fuel cell terminal to a fuel cell ground is not changed when the electric motor winding is connected to a common ground.

The power assembly of any preceding clause, further comprising a first DC electric bus electrically coupling the fuel cell module to the DC/AC portion of the DC/DC converter, and which further includes a second DC electric bus electrically coupling the AC/DC portion of the DC/DC converter to the power load.

The power assembly of any preceding clause, further comprising a battery electrically coupled to the first DC electric bus.

The power assembly of any preceding clause, further comprising a battery electrically coupled to the second DC electric bus.

The power assembly of any preceding clause, further comprising a battery and a third DC electric bus, the third DC electric bus electrically coupling the battery to the DC/AC portion of the DC/DC converter.

The power assembly of any preceding clause, wherein the first DC electric bus provides a unidirectional power flow from the fuel cell module to the DC/DC converter, and wherein the third DC electric bus provides a bidirectional power flow between the battery and the DC/DC converter.

The power assembly of any preceding clause, wherein the DC/DC converter is a first DC/DC converter, wherein the DC/AC portion is a first DC/AC portion, wherein the AC/DC portion is a first AC/DC portion, wherein the first DC electric bus electrically couples the fuel cell module to the first DC/AC portion of the first DC/DC converter, and wherein the second DC electric bus electrically couples the first AC/DC portion of the first DC/DC converter to the power load.

The power assembly of any preceding clause, further comprising: a second fuel cell module configured to provide a second fuel cell direct current (DC) power output; a second battery configured to provide a second battery DC power output; and a second DC/DC converter configured to convert the second fuel cell DC power output to the load power input provided to the power load, the second DC/DC converter having a second transformer configured to electrically isolate the second fuel cell from the power load; wherein the second DC/DC converter includes a second DC/AC portion and a second AC/DC portion, which further includes a third DC electric bus electrically coupling the fuel cell module to the second DC/AC portion of the second DC/DC converter, and which further includes a fourth DC electric bus electrically coupling the second AC/DC portion of the second DC/DC converter to the power load.

The power assembly of any preceding clause, which further includes a switch configured to separately electrically connect (1) the first AC/DC portion of the first DC/DC converter to the power load; or (2) the second AC/DC portion of the second DC/DC converter to the power load.

The power assembly of any preceding clause, further comprising a diode electrically connected between a first fuel cell module and a first DC bus.

The power assembly of any preceding clause, wherein at least one of the DC/AC portion and the AC/DC portion of the DC/DC converter includes: (1) a full bridge topology; (2) a half bridge topology; and (3) a push-pull topology.

A method of operating a power assembly for an aeronautical vehicle, the method comprising: providing a fuel cell direct current (DC) power output to an isolated DC/DC converter, the isolated DC/DC converter having a transformer, wherein the transformer includes a first side coil and a second side coil; drivingly energizing the first side coil of the transformer using power provided by the fuel cell direct current; as a result of the drivingly energizing the first side coil, inductively energizing a second side coil of the transformer; and as a result of the inductively energizing the second side coil of the transformer, generating a converter output current to drive a load.

The method of the preceding clause, further comprising providing a battery DC power output in parallel electrical connection with a fuel cell direct current power output.

The method of any preceding clause, further comprising providing a battery DC power output in parallel electrical connection with the converter output current.

The method of any preceding clause, further comprising energizing the second side coil of the transformer with power from the load, and as a result of the energizing the second side coil, inductively energizing the first side coil.

The method of any preceding clause, which further includes prohibiting bi-directional power flow to a fuel cell module through use of a diode.

A power assembly of any preceding clause for an aeronautical vehicle, the power assembly comprising a controller having memory and one or more processors, the memory storing instructions that when executed by the one or more processors cause the controller, the power assembly or both to perform operations, wherein the operations include one or more steps of a method of any preceding clause.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A power assembly for an aeronautical vehicle, the power assembly comprising:

a fuel cell configured to provide a fuel cell direct current (DC) power output;

a power load configured to receive a load power input a battery;

a DC/DC converter configured to provide a powered coupling between the fuel cell and the power load, the DC/DC converter having:

a DC/AC portion in electric communication with the fuel cell and configured to receive the fuel cell DC power output;

an AC/DC portion in electric communication with the power load and the battery and configured to provide the load power input;

a controller operably coupled to the DC/DC converter and configured to limit a slew rate of the fuel cell, wherein the battery is configured to provide instantaneous increases and decreases in power to meet increase and decrease rates of the power load as limited by the slew rate of the fuel cell; and a transformer inductively coupling the DC/AC portion with the AC/DC portion;

wherein the transformer of the DC/DC converter provides electric isolation between the DC/AC portion and the AC/DC portion.

2. The power assembly of claim 1, wherein the DC/DC converter is configured as a dual active bridge DC/DC topology.

3. The power assembly of claim 1, further comprising a coolant tank having a working fluid coolant, wherein the coolant tank is in fluid communication with the fuel cell such that the working fluid coolant is conveyed from the coolant tank to the fuel cell to thermally cool the fuel cell.

4. The power assembly of claim 3, wherein the fuel cell is mechanically connected to a fuel cell chassis, wherein the fuel cell chassis and the coolant tank are grounded to a common ground, wherein the fuel cell includes a first fuel cell terminal and a second fuel cell terminal.

5. The power assembly of claim 1, further comprising a first DC electric bus electrically coupling the fuel cell to the DC/AC portion of the DC/DC converter, and which further includes a second DC electric bus electrically coupling the AC/DC portion of the DC/DC converter to the power load.

6. The power assembly of claim 5, further comprising the battery electrically coupled to the first DC electric bus.

7. The power assembly of claim 5, further comprising the battery electrically coupled to the second DC electric bus.

8. The power assembly of claim 5, wherein the first DC electric bus provides a unidirectional power flow from the fuel cell to the DC/DC converter.

9. The power assembly of claim 8, wherein the DC/DC converter is a first DC/DC converter, wherein the DC/AC portion is a first DC/AC portion, wherein the AC/DC portion is a first AC/DC portion, wherein the first DC electric bus electrically couples the fuel cell to the first DC/AC portion of the first DC/DC converter, and wherein the second DC electric bus electrically couples the first AC/DC portion of the first DC/DC converter to the power load.

* * * * *